United States Patent [19]

Taki

[11] Patent Number: 4,677,570

[45] Date of Patent: Jun. 30, 1987

[54] INFORMATION PRESENTING SYSTEM

[75] Inventor: Hisao Taki, Tokyo, Japan

[73] Assignee: Kabushiki Kaisha (NKB Corportion), Japan

[21] Appl. No.: 632,325

[22] Filed: Jul. 19, 1984

[30] Foreign Application Priority Data

Nov. 29, 1983 [JP] Japan .............................. 58-223067

[51] Int. Cl.⁴ .................... G06F 15/40; G09G 3/02
[52] U.S. Cl. ..................................... 364/518; 340/717
[58] Field of Search ....................... 340/717; 364/518

[56] References Cited

U.S. PATENT DOCUMENTS 3,774,158  11/1973  Clark .............................. 340/717 X
3,786,479   1/1974  Brown et al. ...................... 340/717

Primary Examiner—Parshotam S. Lall
Assistant Examiner—Joseph L. Dixon
Attorney, Agent, or Firm—Lackenbach Siegel Marzullo & Aronson

[57] ABSTRACT

An information display system which comprises a plurality of sets of terminal equipment, each set including a CRT for indicating a menu having a plurality of selection branches, monitoring picture tubes for displaying a motion picture, and/or a still picture, and input terminals for inputting data to start the operation of selection of a menu. The motion picture or the still picture is displayed on the monitoring picture tubes according to the selected menu for presenting desired information desired by the user of the system.

5 Claims, 3 Drawing Figures

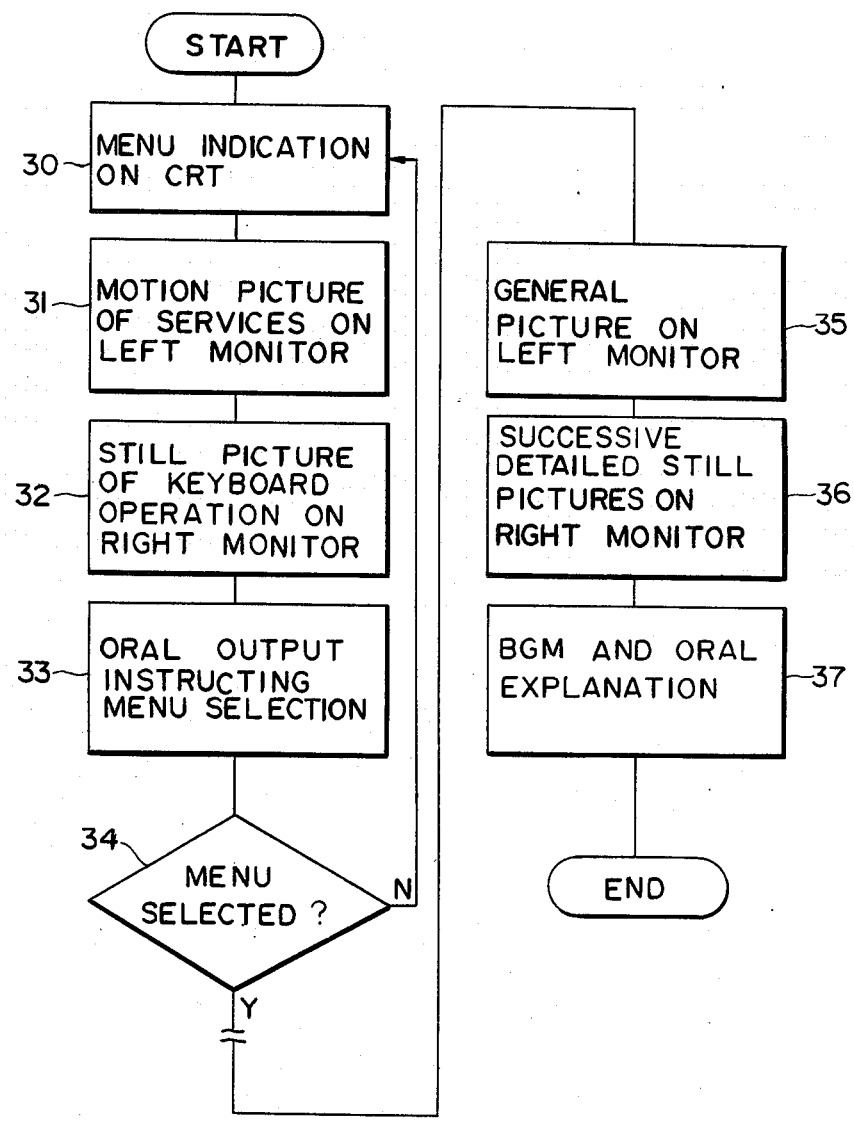

INFORMATION PRESENTING SYSTEM

BACKGROUND OF THE INVENTION

1. Field of the Invention

This invention relates to an information presenting system, and more particularly to an information presenting system capable of presenting desired information to a user in a visual and audible form.

2. Prior Art

Heretofore, there has been proposed an information presenting system for selecting and presenting informations on for example hotels, restaurants, real estates, etc. as desired by a customer.

However, the conventional system employs one monitoring picture tube (hereinafter referred to as "monitor") so that the customer must operate a keyboard for information selection so as to obtain the selected information on the monitor while reading the instructions for the operation procedures. For this reason, an unpracticed person has some difficulty in carrying out the operation without failure. In addition, since the system has only one monitor, the amount of information capable of being presented to the customer, i.e., the user of the system, is limited and the time required for presenting the desired information is considerably long.

SUMMARY OF THE INVENTION

It is therefore a first consideration of the present invention to provide an information presenting system which is capable of presenting sufficient information to a customer in a reduced time, simple in operation and free from misoperation and capable of presenting plural informations for allowing desired comparison between the presented informations.

In accordance with the present invention, there is provided an information presenting system which comprises a plurality of groups of terminal equipments each including a CRT for indicating a menu having a plurality of selection branches, two monitoring picture tubes for indicating a motion picture and/or still picture, and input equipments for starting the operation of the system or selecting the menu; a still picture reproducing means for reproducing a plurality of still pictures; a motion picture reproducing means for reproducing a plurality of kinds of motion picture; a menu indication means for indicating a menu of a kind corresponding to the input from the input equipment on the CRT in the group of the terminal equipments whose input equipment has been actuated; and a picture indicating means for indicating on the monitoring picture tubes a still picture reproduced by the still picture reproducing means in response to the input and a motion picture reproduced by the motion picture reproducing means in response to the input.

Further according to the present invention, there is provided an information presenting system which comprises a plurality of groups of terminal equipments each including a CRT for indicating a menu having a plurality of selection branches; monitoring picture tubes for indicating a motion picture and/or a still picture, and input equipments for initiating the operation of the system or selecting the menu, thereby to indicate the motion picture and/or still picture on the monitoring tubes in response to the operation of the input equipments for presenting a desired information, which further comprises a still picture reproducing means having a plurality of still pictures recorded therein and reproducing picture signal of the still picture in response to the operation of the input devices; frame memories provided for the respective terminal equipments and recording the picture signals of the still pictures for repeatedly reproducing the picture signals of the still pictures and indicating them on the monitoring picture tubes of the corresponding terminal equipments, respectively, and a multiplexer for proving the picture signals of the still pictures reproduced by the still picture reproducing means to the frame memories corresponding to the terminal equipment including said input device.

BRIEF DESCRIPTION OF THE DRAWINGS

FIG. 3 is a flowchart of one example of the program to be carried out by a main computer employed in the system.

PREFERRED EMBODIMENT OF THE INVENTION

Figure 1:
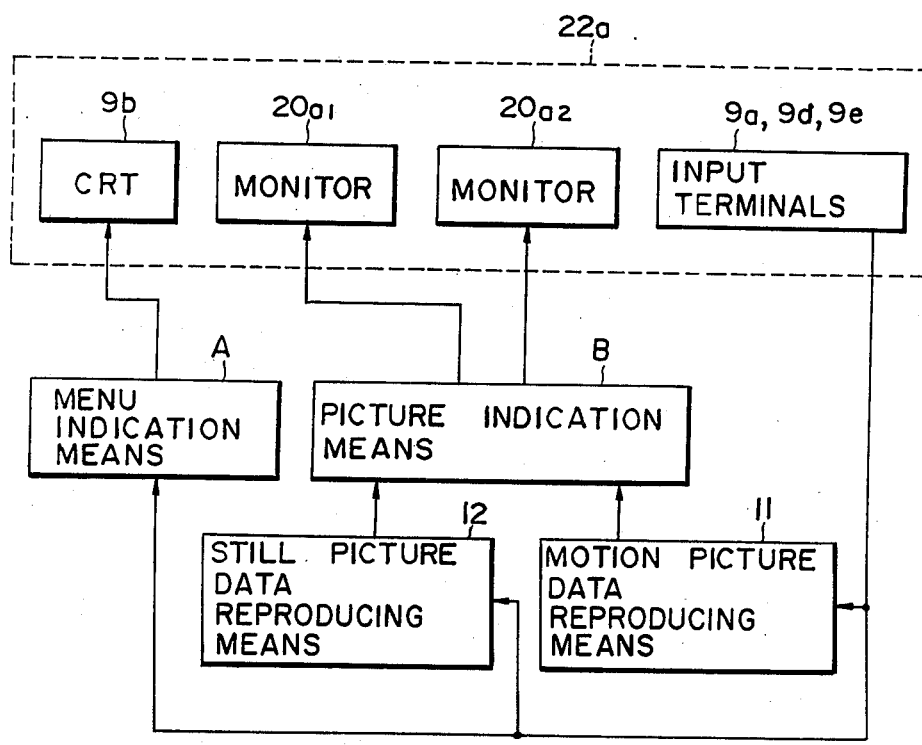
FIG. 1 is a block diagram of a general formation of an information presenting system according to the present invention.

FIG. 1 is a general diagram of an information presenting system according to the present invention. The system includes a plurality of sets of terminal equipment. Each of the sets of terminal equipment comprises a CRT display (hereinafter referred to as "CRT") 9b for displaying a menu, two monitoring picture tubes $20a_1$ and $20a_2$ for displaying a still picture and/or a motion picture end input terminates 9a, 9d and 9e for inputting data for start of the operation or selection of the menu. A still picture rigid reproducing means 12 is for reproducing a plurality of still pictures and a motion picture signal reproducing means 11 is for reproducing various kinds of motion pictures. A menu indicator means A produces a menu on CRT 9b in the set of terminal equipment whose input terminals 9a, 9b or 9e are operated. The still picture signal reproduced by the still picture signal reproducing means 12 and/or the motion picture signal reproduced by the motion picture reproducing means 11 in response to operation of the input terminals is supplied to a picture indicator indicating means B. The picture indication causes B makes the corresponding pictures to be displayed indicated on the monitoring picture tubes $20a_1$ and $20a_2$, respectively, in response to the input.

Figure 2:
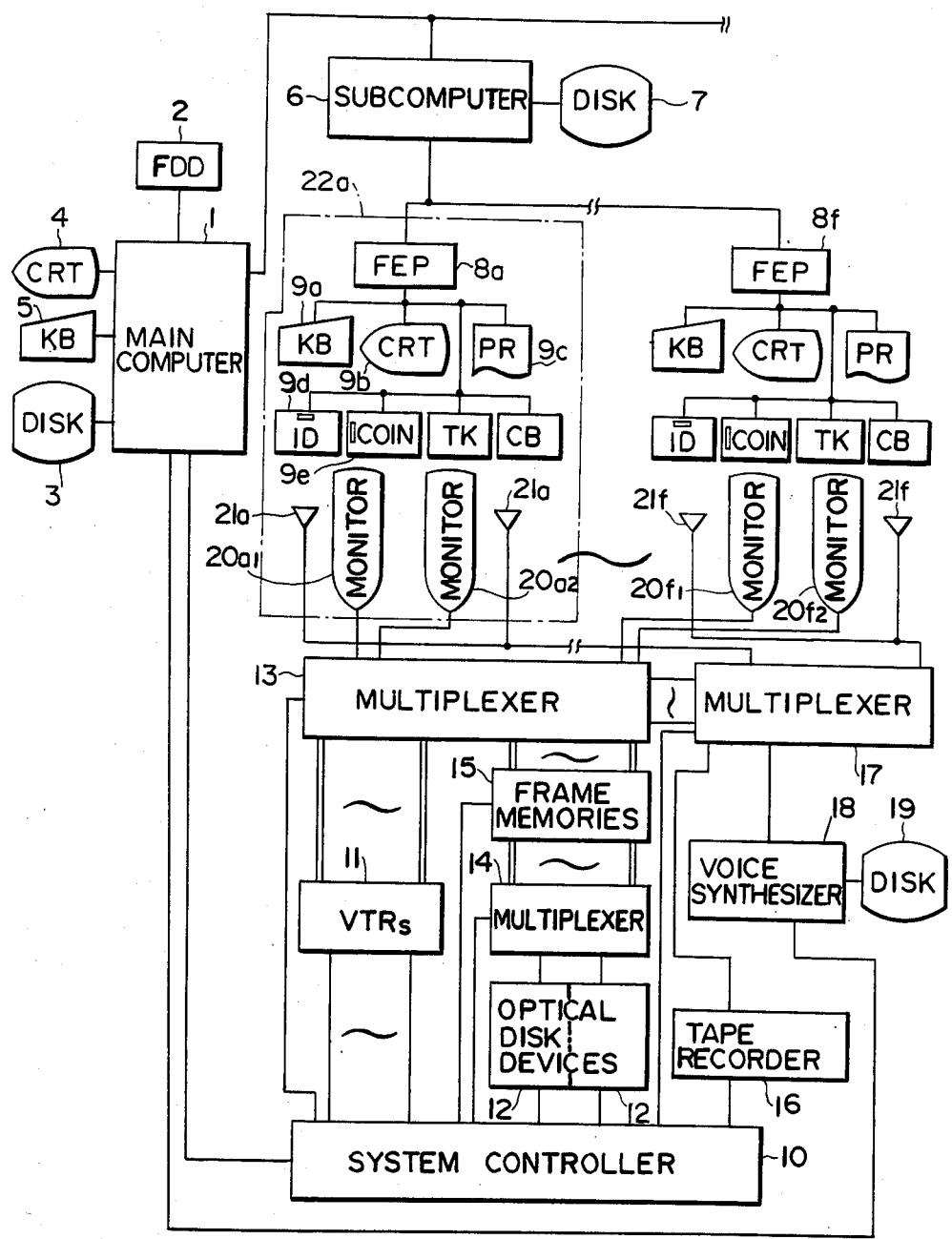
FIG. 2 is a diagram of a system arrangement of the information system of the present invention.

FIG. 2 is a block diagram of one form of a system arrangement of the present invention. In FIG. 2, 1 is a main computer which carries out various controls of the whole system. The main computer 1 has a floppy disk device 2 and a magnetic disk device 3 as external memories. The operating condition of the main computer 1 is displayed on CRT 4 so that the operator can operate the main computer 1 by a keyboard 5 according to the display.

A subcomputer 6 provides data transmission and reception in relation with the main computer 1. Similar subcomputers other than the subcomputer 6 as illustrated may also be connected to the main computer 1. The subcomputer 6 has a magnetic disk device 7 as an external memory. For example six front-end processors 8a to 8f are connected to the subcomputer 6. Input terminals such as a A keyboard 9a, CRT 9b, a printer 9c, a card reader 9d and a thrown-in coin recognizing device 9e are connected to the front-end processor 8a. The front-end processor 8a makes a menu having a plurality of selection branches to be reproduced on CRT 96 under the control of the subcomputer 6, transmits input data provided by the keyboard 9a, the card reader 9d and/or the coin recognizing device 9e to the subcomputer 6 and makes the printer 9c carry out printing under the control of the subcomputer 6. The other subcomputers than the subcomputer 6 would be arranged and operated similarly and description thereof is omitted.

A system controller 10 operates videotape recorders (hereinafter referred to as VTR) 11, optical disk devices 12, multiplexers 13, 14 and 17, frame memories 15 and a tape recorder 16 according to a control signal supplied by the main computer 1. In the embodiment, 12 VTRs 11 are provided, each two of which are associated with respective one of the six front-end processors 8a to 8f. The VTRs are operated independently of each other by signals from the system controller 10. The video signals and aural signals reproduced by the respective VTRs are supplied to the multiplexer 13.

Two optical disk devices 12 are employed in the embodiment as illustrated. These two disk devices are operated independently of each other by signals from the system controller 10. The still picture signals reproduced by the respective optical disk devices are supplied to the multiplexer 14. The multiplexer 14 supplies each of the two still picture signals from the respective optical disk devices 12 to any one of the 12 frame memories 15 in response to the control signals from the system controller 10. Each two of the 12 frame memories 15 are associated with the respective front-end processor 8a to 8f. Each frame memory 15 records the still picture signal supplied through the multiplexer 14, and the frame memory designated by the control signal from the system controller 10 reads out the still picture signal recorded therein and supplies it to the multiplexer 13.

The multiplexer 13 supplies aural signals from the VTRs 11 to the multiplexer 17 and supplies the video signals from the VTRs 11 or picture signals of the still pictures from the frame memories 15 to the respective 12 monitors $20a_1$, $20a_2$, ... $20f_1$, $20f_2$ so as to be displayed thereon in response to the control signal from the system controller 10.

The tape recorder 16 reproduces audio signals recorded thereon such as background music etc. according to the control signal from the system controller 10 and supplies the aural signals to the multiplexer 17. The main computer 1 supplies a control signal to the voice synthesizer 18 to operate the same. The voice synthesizer 18 synthesizes various voice data stored in the magnetic disk device 19 to produce an aural signal and supplies the same to the multiplexer 17. The multiplexer 17 supplies the aural signals of 12 systems from the multiplexer 13, an aural signal from the tape recorder 16 and an aural signal from the voice synthesizer 18 to the loudspeakers 21a to 21f of six systems so as to provide an oral message, by selecting and/or combining them according to the control signal from the system controller 10.

The front-end processor 8a, the keyboard 9a menu, CRT 9b, the card reader 9b, the coin recognizing device 9e, the display monitors $20a_1$, $20a_2$ and the loudspeaker 21a constitute one set of terminal equipment 22a. The other front-end processors also constitute similar sets of terminal equipment, respectively. Thus, each set of terminal equipment includes one menu CRT and two display monitors.

On example of the operation of the system according to the present invention will now be described referring to the flowchart of FIG. 3.

The main computer 1 causes a still picture showing informations or guides for example for hotels, restaurants, real estates, etc. to be reproduced from the optical disk devices and displayed, on a left monitor (for example the monitor $20a_1$) of the respective sets of terminal equipment, and reproduces a still picture for example for showing the operation of inserting a card into the card reader. In this state, if a card is inserted into the card reader 9d or a coin is thrown into the coin recognizing device 9e, the main computer 1 starts the program as illustrated in FIG. 3.

At a step 30, the subcomputer 6 transmits data for menu indication read out from the disk device 7 to the front-end processor 8a according to the instructions from the main computer 1. As a result, the menu for selection of services such as "1. Guide for restaurants, 2. Guide for hotels, 3. Guide for real estates, . . . " is displayed on the menu CRT 9b. At a step 31, a control signal is supplied to the system controller 10. As a result, the VTR which is associated with the front-end processor 8a of the group of VTRs associated with the left monitor reproduces a part of recorded motion picture for dividingly indicating the above-mentioned services in one frame. This video signal is supplied to the left monitor $20a_1$ through the multiplexer 13 and displayed thereon. At a step 32, a control signal is supplied by computer to the system controller 10 so that a still picture in which a message such as "Please select a desired number." is superposed on the picture which shows the operation of the keyboard, is selectively reproduced by an optical disk device 12 and supplied through the multiplexer 14 to the frame memory associated with the front-end processor 8a and the right monitor and recorded therein. This still picture is repeatedly reproduced and the video signal thereof is supplied to the sight monitor $20a_2$ through the multiplexer 13 and displayed thereon. At a step 33, a control signal is supplied to the voice synthesizing device 18. As a result, the voice synthesizing device 18 synthesizes a speech such as "Please select a desired number." and the voice signal is supplied to the loudspeaker 21a through the multiplexer 17 so that an oral message is given.

Thereafter, at a step 34, it is determined whether selection of the menu has been completed by the operation of the keyboard 9a or not. After the selection of a general menu has been made, more detailed menu selection processing for the selected service is carried out. The more detailed processing operations thereafter are similar to those of the steps 30 and 34, so that the description thereof is omitted here.

After selection of the menu, the program proceeds in step 35 to a detailed presentation of the selected service. If the service of hotels has been selected at step 34 in step 35, the VTR which is associated with the front-end processor 8a and associated with the left monitor reproduces a motion picture showing the appearance of the desired hotel and the picture is displayed on the left monitor $20a_1$. At step 36, the still pictures reproduced by the optical disk devices and showing for example the surroundings of the hotel, a lounge, a garden, restaurants, etc. are successively presented on the right monitor $20a_2$. At step 37, oral messages corresponding to the still pictures presented on the monitor $20a_2$ are synthesized by the voice synthesizer 18. The oral messages are superposed with a background music reproduced by the tape recorder 16 and presented by the loudspeaker 21a.

Procedures similar to the steps 35 to 37 are repeated until the information service for hotels has been completed by the monitors $20a_1$, $20a_2$ and the loudspeaker 21a and thereafter the program of FIG. 3 is finished.

As described above, according to the present embodiment, since a menu is presented on CRT 9b and a still picture showing the operation of keyboard 9a is presented on the monitor $20a_2$, the user of the system of the present invention finds no difficulty in the operation. In addition, different informations are presented through the two monitors $20a_1$, $20a_2$ so that various informations can be obtained in a short time and comparison of the informations can be made.

In a modified embodiment of the present invention, picture signals of still pictures reproduced by the two optical disk devices 12 are once recorded in the frame memories (each of the terminal equipments groups has two frame memories) and the recorded picture signals are repeatedly reproduced. Therefore, each of the sets of terminal equipment does not always need its own optical disk device. The number of the optical devices employed in the system can therefore be reduced and the cost of the entire system can be reduced.

More specifically, according to the present modification, two disk devices 12 are provided and the devices are operated independently of each other in response to the control signal from the system controller 10. A number of still pictures of different contents are recorded on each of the optical disk mounted of the respective optical disk device. Each of the optical disk devices reproduces a still picture designated by the control signal and provides a reproduced picture signal of the still picture to the multiplexer 14.

The multiplexer 14 is coupled to each of 12 frame memories 15 and supplies the picture signals of the still pictures supplied from the optical disk devices 12 to the frame memory designated by a control signal from the system controller 10. Each two of the 12 frame memories 15 are associated with respective ones of the front-end processors 8a to 8f. One of the frame memories associated with the respective front-end processor is associated with for example a right monitor while the other is associated with a left monitor. Each frame memory records therein a picture signal of a still picture from the optical disk device supplied through the multiplexer 14. The frame memory repeatedly reproduces the picture signal of the still picture recorded therein when it is designated by a control signal from the system controller 10 to supply the same to the multiplexer 13.

This modified arrangement of the system is substantially the same as that of the foregoing embodiment.

What is claimed is:

1. An information presenting system comprising:
   computing means;
   a system controller actuated by said computing means;
   a plurality of sets of terminal equipments, each of such sets of terminal equipment comprising:
   a front-end processor for creating selection menus having a plurality of selection branches;
   a CRT controlled by said processor for displaying any of such menus;
   a plurality of input terminals operable to cause said processor to select a particular menu;
   said processor being adapted to signal said computing means which menu has been selected, whereupon said computing means actuates the system controller in accordance with such selected menu;
   and two monitoring picture tubes for respectively displaying a motion picture and a still picture;
   still picture data reproducing means controlled by said system controller for reproducing data representing a plurality of still pictures corresponding to the menus selected by each of said sets of terminal equipment;
   motion picture data reproducing means controlled by said system controller; for reproducing data representing a plurality of motion pictures corresponding to the menus selected by each of said sets of terminal equipment;
   and picture indicating means for causing the monitoring picture tubes of each of said sets of terminal equipment to respectively display a still picture corresponding to the menus selected by such sets from the data reproduced by said still picture data reproducing means, and a motion picture corresponding to such said selected menus from the data reproduced by said motion picture data reproducing means.

2. An information presenting system according to claim 1, wherein said input terminals comprise a keyboard, a card reader and a coin recognizing device.

3. An information presenting system according to claim 1, wherein said motion picture reproducing means comprises a plurality of videotape recorders.

4. An information presenting system according to claim 1, wherein said still picture reproducing means comprises a plurality of optical disk devices.

5. An information presenting system according to claim 1, further comprising and a plurality of multiplexers and wherein said system controller operates in response to control signals provided thereto by said main computer to control said multiplexers.

* * * * *